(12) United States Patent
Obermeyer (10) Patent No.: US 12,054,902 B2
(45) Date of Patent: Aug. 6, 2024

(54) FISH PASSAGE SYSTEM FOR MEDIUM AND HIGH HEAD DAMS

(71) Applicant: Henry K. Obermeyer, Wellington, CO (US)

(72) Inventor: Henry K. Obermeyer, Wellington, CO (US)

( * ) Notice: Subject to any disclaimer, the term of this patent is extended or adjusted under 35 U.S.C. 154(b) by 0 days.

(21) Appl. No.: 17/910,808

(22) PCT Filed: Mar. 12, 2021

(86) PCT No.: PCT/US2021/022246
§ 371 (c)(1),
(2) Date: Sep. 10, 2022

(87) PCT Pub. No.: WO2021/183975
PCT Pub. Date: Sep. 16, 2021

(65) Prior Publication Data
US 2023/0117154 A1 Apr. 20, 2023

Related U.S. Application Data

(60) Provisional application No. 62/988,897, filed on Mar. 12, 2020.

(51) Int. Cl.
*E02B 8/08* (2006.01)
(52) U.S. Cl.
CPC ............... *E02B 8/085* (2013.01); *E02B 8/08* (2013.01)
(58) Field of Classification Search
CPC .................................. E02B 8/08; E02B 8/085
USPC ....................................... 405/81–83; 119/219
See application file for complete search history.

(56) References Cited

U.S. PATENT DOCUMENTS

| | | | |
|---|---|---|---|
| 2,363,154 | A | 11/1944 | Smith |
| 2,625,798 | A | 1/1953 | Reed |
| 3,038,314 | A | 6/1962 | Hultman |
| 3,596,468 | A | 8/1971 | Fairbanks |
| 4,360,286 | A | 11/1982 | Beer |
| 4,896,275 | A | 1/1990 | Jackson |
| 5,161,913 | A | 11/1992 | Boylan |
| 5,660,499 | A | 8/1997 | Bethune |
| 6,155,746 | A | 12/2000 | Peters |
| 6,273,639 | B1 | 8/2001 | Eikrem et al. |
| 6,394,699 | B1 | 5/2002 | Neufeld |
| 6,832,578 | B2 | 12/2004 | Odeh |

(Continued)

FOREIGN PATENT DOCUMENTS

| | | |
|---|---|---|
| DE | 19510347 C1 | 3/1995 |
| DE | 10003761 A1 | 8/2001 |

(Continued)

OTHER PUBLICATIONS

Korean document 10-2008-0073391 (Year: 2008).*
Chinese document 105862686 (Year: 2016).*
Fish Passage Technologies: Protection at Hydropower Facilities, Sep. 1995, OTA-ENV-641, GPO stock #052-003-01450-5.

(Continued)

*Primary Examiner* — Sunil Singh (57) ABSTRACT

The present invention is a fish passage system for use at dams. It may incorporate one or more reversible pump-turbines for controlling and generating power from downstream flow of water and fish and for pumping water and fish upstream. For low head embodiments the system may use water stored at above headwater elevation in lieu of a reversible pump turbine for moving fish and water from tailwater to headwater.

13 Claims, 4 Drawing Sheets

(56) References Cited

U.S. PATENT DOCUMENTS

| | | |
|---|---|---|
| 6,905,287 B2 | 6/2005 | Doolaege |
| 7,249,915 B2 | 7/2007 | Tucker |
| 8,011,854 B1 | 9/2011 | Millard |
| 10,206,380 B1 | 2/2019 | Bokelaar |
| 10,633,813 B2 | 4/2020 | Aittaniemi |
| 2003/0133754 A1 | 7/2003 | Barnett |
| 2007/0065231 A1 | 3/2007 | McWha |
| 2010/0086357 A1 | 4/2010 | Don |
| 2011/0280663 A1 | 11/2011 | Millard |
| 2014/0356070 A1 | 12/2014 | Stromotich |
| 2016/0024735 A1 | 1/2016 | Truebe et al. |
| 2017/0238512 A1 | 8/2017 | Hilmarsson et al. |
| 2019/0119874 A1 | 4/2019 | Aittaniemi |

FOREIGN PATENT DOCUMENTS

| | | |
|---|---|---|
| GB | 2462431 | 10/2020 |
| WO | 20030023149 A1 | 3/2003 |
| WO | 2012081830 A1 | 6/2012 |
| WO | 2012115522 A1 | 8/2012 |
| WO | 2017187020 A1 | 11/2017 |

OTHER PUBLICATIONS

Hubble, J. et al. Reclamation—Managing water in the west, Yakima Basin Science & Management Conference, Jun. 17, 2015.
Fish Passage Planning and Evaluation, Feb. 2004 PacifiCorp.
Yakima River Basin Study, Fish Passage at Clear Lake Dam, Technical Memorandum U.S. Bureau of Reclamation, Contract No. 08CA10677A ID/IQ, Task 4.1, Mar. 2011.
Fish Passes: Design, Dimensions and Monitoring, Food and Agriculture Organization of the United Nations, Deutscher Verband für Wasserwirtschaft und Kulturbau e.V. (DVWK), Rome, 2002.
Fish Passage Research: S.O. Conte Anadromous Fish Research Laboratory, US Department of the Interior, 2008.
Waldman, J, Blocked Migration: Fish Ladders on U.S. Dams Are Not Effective, Yale Environment 360, printed Oct. 14, 2015.
ASMFC Workshop on Fish Passage Issues Impacting Atlantic Coast States, 2008.
Powers, P. et al. New Concepts in Fish Ladder Design, vol. III of IV, Fishways—An Assessment Of Their Development And Design, Final Report, 1985.
Berka, R, 1986, The transport of live fish. A review. EIFAC Tech. Pap., (48):52 p.
National Engineering Handbook, Technical Supplement 14N, Fish Passage and Screening Design, 210-V1-NEH, Aug. 2007.
International Application No. PCT/US2021/022246; Written Opinion of the International Searching Authority dated Mar. 6, 2021.
International Application No. PCT/US2021/022246; International Search Report dated Mar. 6, 2021.
U.S. Appl. No. 62/988,897, filed Mar. 12, 2020.
Search Report from Parallel European Patent No. 21768333.3 dated Feb. 27, 2024.

* cited by examiner

FISH PASSAGE SYSTEM FOR MEDIUM AND HIGH HEAD DAMS

This application is the United States National Stage of International Application No. PCT/US2021/022246 filed Mar. 21, 2021, and which also claims benefit of and priority to U.S. Provisional Application No. 62/988,897 filed Mar. 12, 2020. Each said application is incorporated herein by reference.

FIELD OF THE INVENTION

The present invention relates to fish passage at medium and high head dams. Fish ladders have generally been successful at low head power plants, however, the large footprint required for fish ladders is not available at all sites and can make site preparation and construction expensive. Fish ladder success at medium and high head dams has been limited due to physical endurance limitations of the fish as well as the difficulty of construction. In some cases, the only available space is subject to flood borne debris damage, erosion, and unacceptable deposition of rock and gravel. The recently introduced Wooshh™ Innovations system successfully transports fish of generally uniform size upstream. Trap and truck operations have been successful but are expensive to operate. Mechanical fish lifts have worked where site geometry allows for a straight vertical or inclined lift of a tank.

SUMMARY OF THE INVENTION

There remains a need for non-labor-intensive, safe and effective upstream transport of mixed sizes and mixed species of fish at medium and high head hydroelectric projects. The proposed system combines pneumatically operated gates for trapping fish and dropping them into a penstock. Once in the penstock the fish are constrained on the downstream side by an isolation valve and contained on the upstream side by the free water surface. For medium and high head projects a variable speed reversible pump-turbine pushes water and fish up the penstock and into the upper reservoir. For low head projects, where less power is required for lifting the fish, water may be stored in a tank above headwater level and then periodically discharged through a penstock to move the fish to the upstream side of the dam. At such low head sites there is limited power that might be recovered in conjunction with downstream fish migration, so a variable speed recovery turbine may not be economically justifiable.

During modes of operation that include downstream fish transport, downstream migrating fish may be trapped behind a suitable weir for example, and then drained with their surrounding water into the penstock and then directed through a fish sluice before reaching the energy recovery turbine.

As the water in the penstock is drained back through the reversible pump turbine, almost all of the energy used for pumping is recovered, while any downstream migrating fish are given a safe ride to tailwater with negligible pressure changes and no high velocity encounters with obstacles. The position within the penstock of the downstream migrating fish may be constrained during transport on the upstream side by the free water surface at atmospheric pressure and on the downstream side by a floating cage. An outlet valve on the penstock in conjunction with a retractable fish screen may be used to drain the fish from the penstock into a fish sluice before they would reach the energy recovery turbine which may be a reversible pump turbine. The fish sluice would deliver the fish safely to tailwater.

In order to load fish for upstream transport the water level in the penstock is preferably reduced to below tailwater elevation by means of an auxiliary pump. This allows the next batch of upstream migrating fish to be drained from the tailwater fish trap into the penstock and then pumped up to the upper reservoir. Fish are subjected to neither high velocity flows nor any pressure changes. The pumping energy required for upstream transport is almost completely recovered while draining the auxiliary penstock (with or without downstream fish transport). Energy use may be further cut in half by using two auxiliary penstocks. The system may be also be used for efficient hydropower generation capacity during non-fish passage seasons.

The present invention includes a fish trap at tailwater elevation for collection of upstream migrating fish. The bottom of the fish trap may include a fish trap drain valve for the purpose of periodically dropping the fish and the water that surrounds them into a transport pipe or penstock. Once inside the penstock the fish may be contained near the upper water surface within the penstock by a floating cage that follows the rising water surface as the penstock is filled by a variable speed reversible pump turbine. In this manner the fish may be elevated from tailwater level to headwater level without ever being pressurized or removed from the water.

The fish may exit the upstream end of the penstock through a flexible duckbill valve, for example. The penstock is preferably fitted with detents to prevent the fish cage from being expelled from the penstock after reaching its upper terminal position. With the fish cage secured by detents, the fish may be ejected from the fish cage by water pressure supplied through a screen bulkhead that is the downstream end of the fish cage. Once the fish are expelled, ingress of water and fish back into the penstock is blocked by the duckbill valve while the penstock is filled from above with air at atmospheric pressure supplied through a vent. The water is drained from the penstock through a reversible pump-turbine which recovers most of the energy from the water being lowered. The speed of the reversible pump turbine is adjusted in proportion to the square root of the head, to maintain best efficiency, as the water is drained back out of the penstock. Downstream migrating fish may be directed to the optional fish cage prior to draining the penstock through the reversible pump-turbine.

BRIEF DESCRIPTION OF THE DRAWINGS

FIG. 1*a* illustrates upstream passage. FIG. 1*b* illustrates downstream passage.

FIG. 2*a* shows valve 22*a* (in closed position)

DETAILED DESCRIPTION OF THE PREFERRED EMBODIMENTS

Figure 1A:
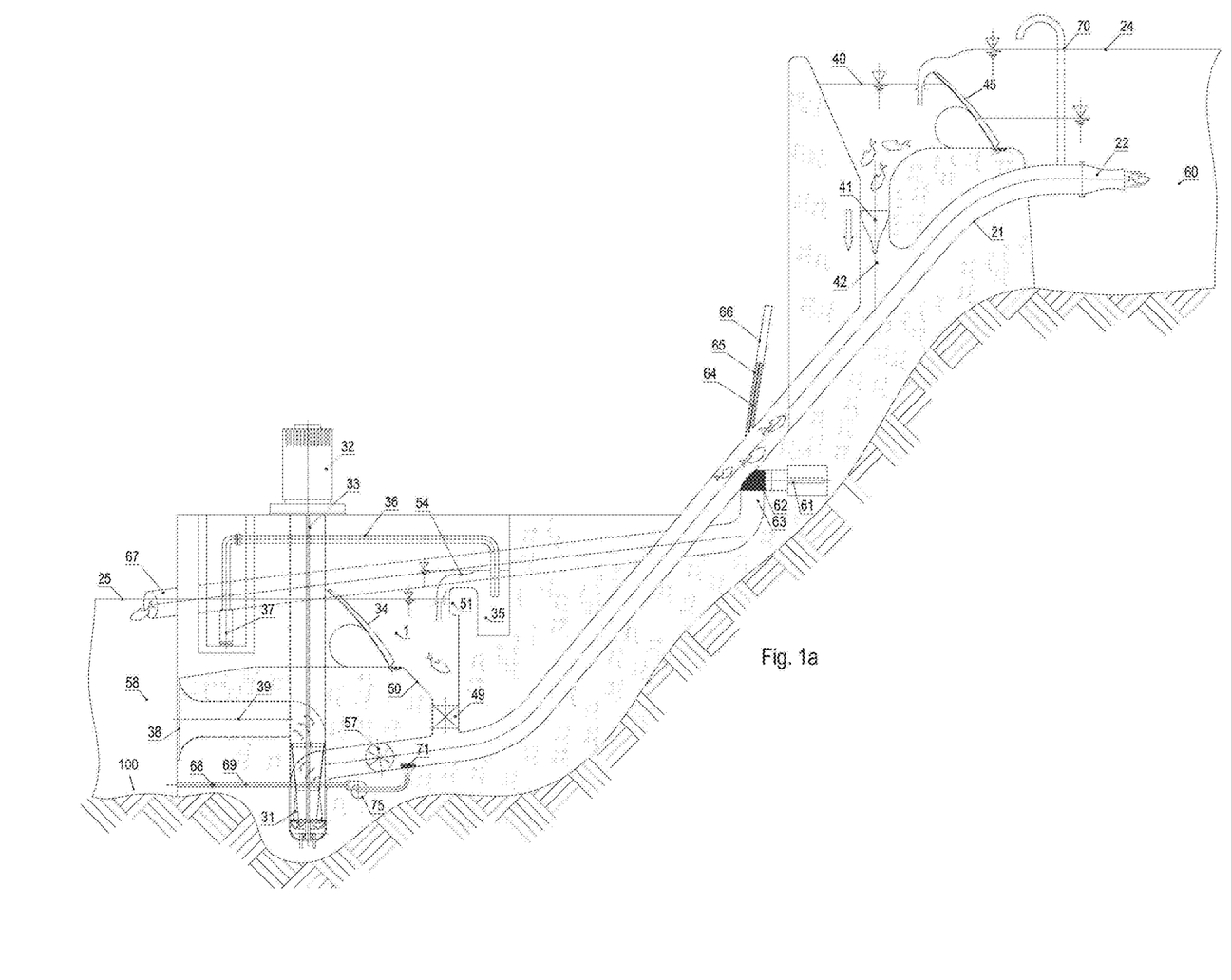
FIGS. 1*a* and 1*b* are schematics of the present invention as it might be configured for fish passage over a medium head or high head dam.
Figure 1B:
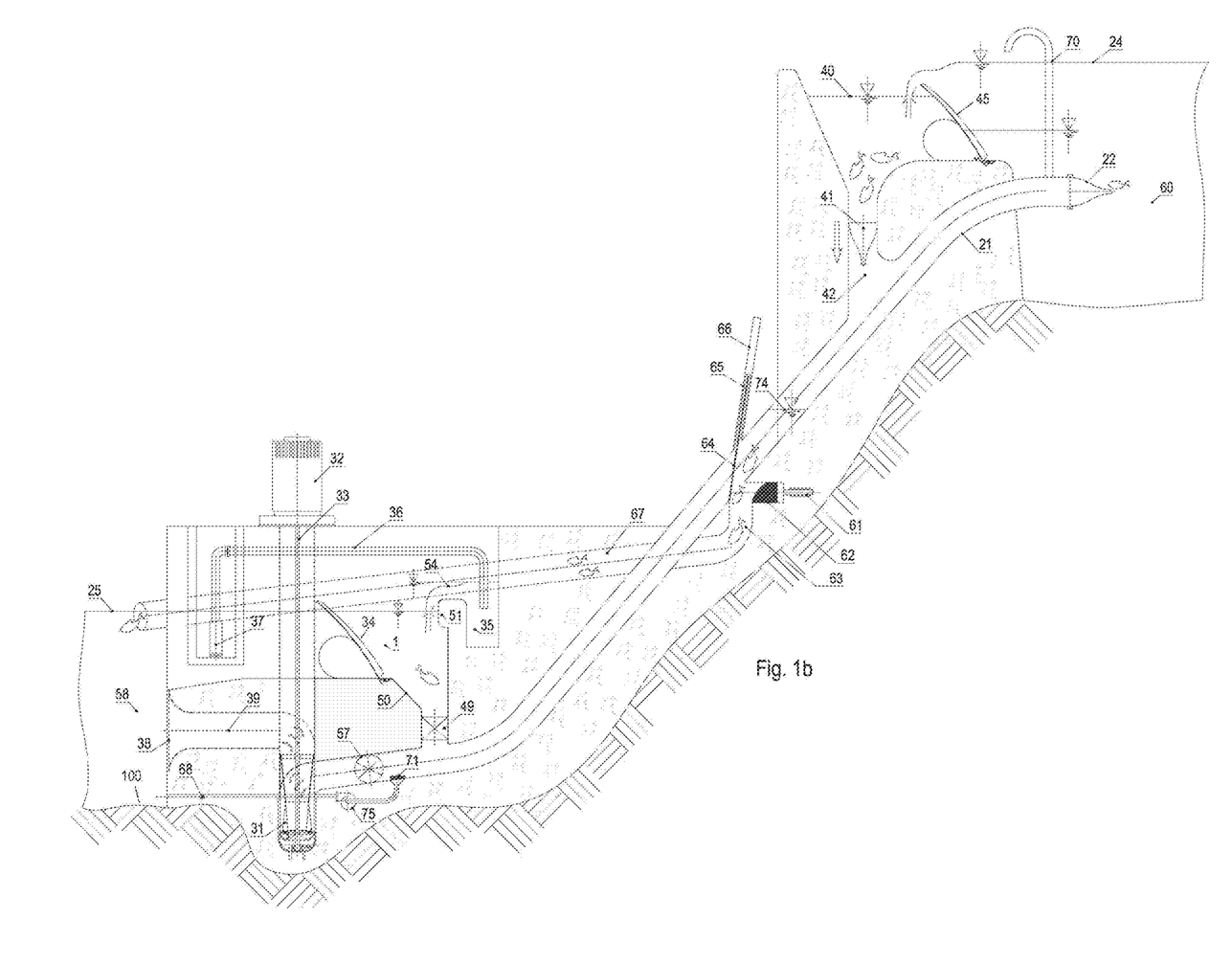

Referring to FIGS. 1*a* and 1*b*, a fish passage system capable of both upstream and downstream fish passage is illustrated. Referring to FIG. 1a, reversible pump turbine 31 is connected to motor generator 32 by shaft 33. Tailrace conduit 39 connects pump turbine 31 to tailwater 58 having tailwater surface 25. Bellmouth intake 38 minimizes inlet losses during pumping mode. Tailwater fish trap 1 may be served by tailwater attraction water pump 37 which supplies tailwater attraction water 54 over weir 51. Once sufficient fish have been attracted into tailwater fish trap 1, tailwater fish isolator such as pneumatically operated gate 34 may be raised to isolate the fish within the trap. At this time tailwater attraction water pump 37 may be shut off. Pump turbine isolation valve 57 allows pump turbine 31 to be isolated from penstock 21. With pump turbine isolation valve 57 closed, penstock dewatering pump 75 may be used to dewater penstock 21 through screen 71. This allows fish to be drained from tailwater fish trap 1 into penstock 21. Once the trapped fish have been drained into penstock 21, fish trap drain valve 49 may be closed, pump turbine isolation valve 57 opened, and pump turbine 31 started. The fish are then carried up penstock 21 at a speed which increases with head in order to operate the pump turbine at its best efficiency pumping speed which varies as the square root of head.

Upstream transport of fish is carried out with retractable fish screen 64 fully retracted and plug valve 62 fully closed. Retractable screen 64 is enclosed within a "screen bonnet" similar to a conventional gate valve bonnet when it is retracted. Retractable screen 64 is actuated by hydraulic or other actuator 66. Check valve 41, above penstock branch 42, remains closed as fish pass through discharge valve 22 into headwater of upper reservoir 60. A fish detection system based on video or sonar sensors, for example, may be used to signal completion of the pumping cycle. The pump turbine may continue to operate in this mode to store additional water in the head pond or upper reservoir if desired.

Increasing speed as pressure in accordance with one aspect of the present invention is illustrated. The system illustrated in FIG. 1a is capable of transporting fish many hundreds of meters in elevation while keeping the fish very near atmospheric pressure. In the case of upstream passage of fish, attraction flow pump 37 feeds water through pipe 36 into attraction flow stilling well 35. The attraction flow water 54 passes over weir 51 and into tailwater fish trap 1. Water control gate 34 is then raised to isolate the tailwater fish trap 1 contents (water and fish) from the tailrace 100. With pump turbine isolation valve 57 closed, penstock dewatering pump 75 is used to pump water from the penstock through piping 69 and check valve 68 into tailrace 100. This lowers the water level in the penstock 21 so it is well below the surface level of the tailwater fish trap 1. Screen 71 prevents fish that enter penstock 21 from entering penstock dewatering pump 75. Fish in tailwater fish trap 1 are lowered through fish trap drain valve 49 into the lower portion of the penstock 21. Pump turbine isolation 57 is closed at this time to hold the fish and water in the penstock 21.

Pump turbine 31 is driven by the motor generator 32 through the power transmission shaft 33. This creates a positive pressure on the downstream side of pump turbine isolation valve 57. The pump turbine isolation valve 57 is then opened to allow water to flow into the penstock 21, raising the water surface level in the penstock and the fish. When the water level reaches the discharge valve 22 at the upper reservoir 60, the pump turbine 31 continues to pump water which forces valve open 22b and pushes the fish into the upper reservoir 60 near the water surface 24. Fish trap drain valve 49 is preferably configured to not injure fish. It may be, for example, a ring follower valve with a flush water passageway surface when open, or it might be a rubber pinch valve with a smooth rubber surface when open. Opening of fish trap drain valve 49 is in any case preferably done quickly so as to not catch a fish against an opening too small for the fish to pass through uninjured. Tailrace conduit 39 connects the low-pressure side of the pump turbine to tailwater 58.

In relation to downstream fish passage, and referring to FIG. 1b, fish are collected in an upper reservoir fish trap 40. Flow into upper reservoir fish trap 40 may be controlled by an adjustable headwater weir in the form of headwater gate such as pneumatically operated gate 45, for example. Upper reservoir fish trap 40 may be continuously drained or pumped of water while retaining fish in order to allow uninterrupted continuous flow of attraction water. With penstock 21 full of stationary water, water control gate 45 is then raised to the closed position. Retractable screen 64 is extended into the penstock via actuator 66 through, e.g., the screen bonnet 65. Check valve 41 then opens in response to downstream flow through the penstock 21, allowing trapped fish to drop into penstock 21 from upper reservoir fish trap 40. Vent 70 allows air to enter the upper section of the penstock 21 as water level decreases. Downstream flow may be regulated with pump turbine isolation valve 57 until the fish are safely within penstock 21. The downstream flowrate may then be adjusted in proportion to the square root of the head, as measured from tailwater elevation to the free water surface in the penstock just above the fish. This allows maximum energy recovery. As the fish and free water surface within the penstock 21 approach retractable fish screen 64, the flow rate may be throttled using pump turbine isolation valve 57. Once pump turbine isolation valve 57 has been fully closed, the fish and water above valve 62 may be released into fish sluice entry 63 by modulating actuator 61 where the water and fish flow through fish sluice 67 leading to tailrace 100. Pump turbine 31 may then be operated through an upstream fish passage cycle or used to refill penstock 21 for a further downstream fish passage cycle.

Figures 2A, 2B:
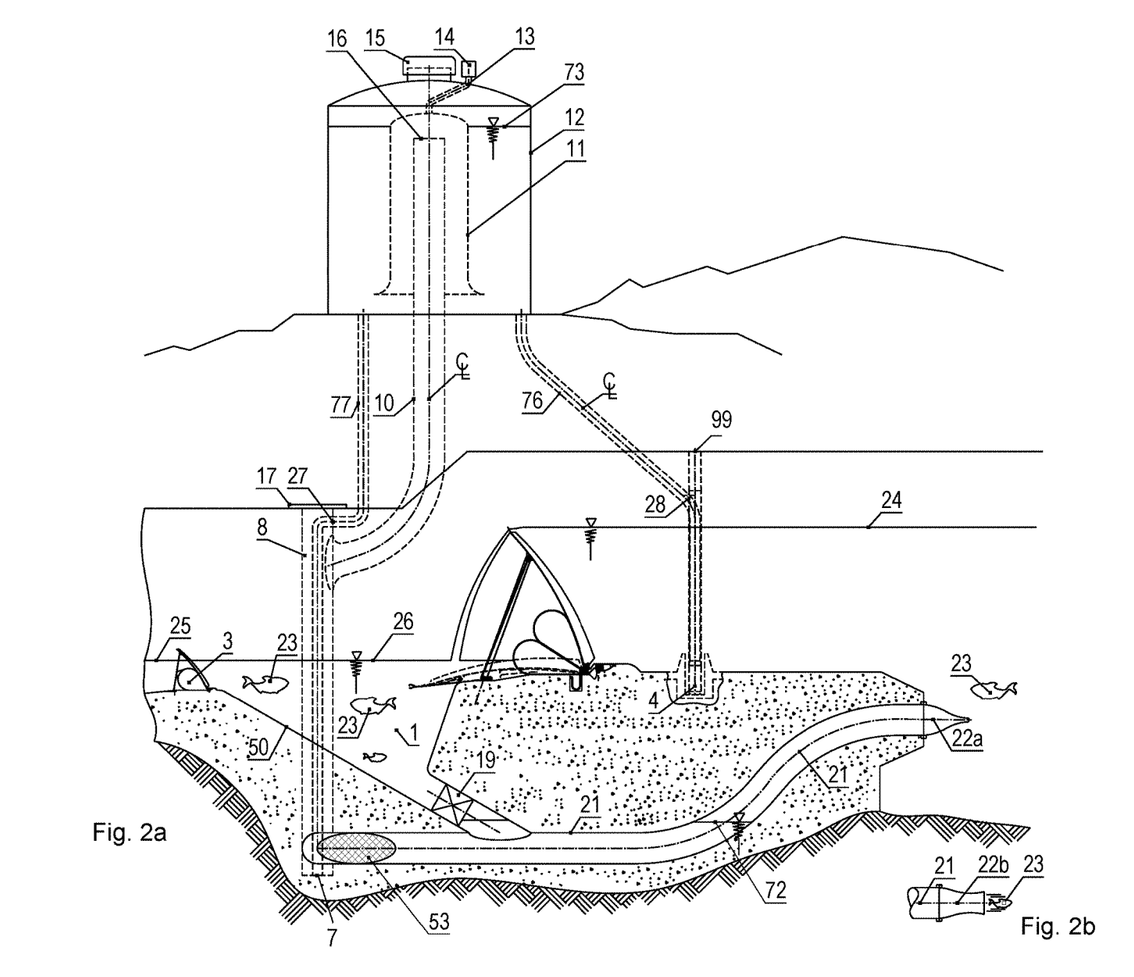
FIG. 2*a* is an embodiment of the present invention as it might be configured for fish passage over low head dams. This utilizes water at greater than headwater pressure to flush fish from a holding enclosure below tailwater up into the headwater.
FIG. 2*b* shows valve 22*b* (in open position).

Referring to FIG. 2a, a fish passage system in accordance with another embodiment of the present invention is illustrated. The system illustrated in FIG. 2a shares many of the features of the system illustrated in FIGS. 1a and 1b, but without the cost of the reversible pump-turbines. Tank 12, with water level 73, is elevated above headwater water surface 24 and controlled with siphon comprised of bell jar 11 and standpipe 16. Air pressure inside the top of the siphon bell jar 11 is controlled by valve 14 which may connect bell jar 11 to either vacuum or atmospheric pressure air. Air vent 15 allows ambient air to replace water flushed from the tank by the siphon. Pipe 10 directs water from the tank to well 8 which also houses pump 7 at the bottom. Water control gate 3 is raised to isolate the fish in the tailwater fish trap 1, with water level 26, from the tailwater 58. Pump 7 is provided to pump, through a screen 53, the water in tailwater fish trap 1 though pipe 77 into tank 12, while lowering the fish 23 into penstock 21, with water level 72. Tailwater fish trap 1 features tapered bottom surfaces 50 that guide fish though the valve 19. Well pit 17 provides access to pit-less adapter 27 for maintenance. Once the fish are in penstock 21, valve 19 is closed. A vacuum applied by valve 13 to bell jar 11 starts a siphon into standpipe 16. Water then discharges down pipe 10 into well 8 and then into penstock 21. The fish 23 are then discharged to headwater of upper reservoir 60 through valve shown in closed position 22a and open position 22b. Such valve is preferably a duckbill check valve. The fish could alternatively be discharged into open air above headwater water surface 24. Tank 12 may be refilled using pump 4 located in well 99 and connected to pipe 76 by pitless adaptor 28. Of course, other sources of water, if available, might be used. The principle distinguishing elements of this invention are the establishment of a lower-than-tailwater pool into which fish may be dropped by gravity with little chance of injury in conjunction with a higher-than-headwater pool of water which can be used to promptly deliver the fish to headwater with minimum transport time and no required physical exertion.

Referring to FIGS. 3a, 3b, 3c, and 3d, a schematic representation of a fish passage system in accordance with the present invention is shown. Air vents 10 and 11 keep the upper end of dual penstocks 77 and 78 at atmospheric pressure. Headwater of upper reservoir 60 is shown connected to dual penstocks 77 and 78 through ball valves 5 and 6 respectively. Reversible pump turbine 4 may be connected in accordance with FIG. 3a as a turbine to lower the water level 79 in penstock 77 while raising the water level 80. For this mode of operation valves 5, 6, 91, 14, and 15 are kept in the closed position while valves 81 and 16 are left open.

Figure 3A:
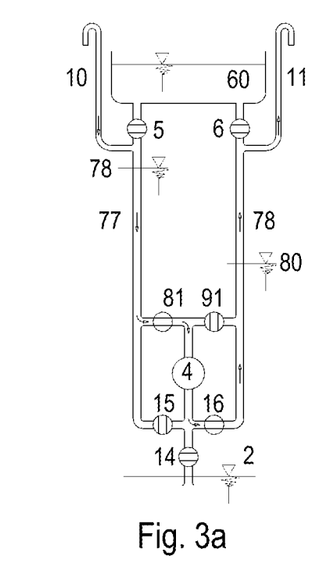
FIGS. 3*a*, 3*b*, 3*c*, and 3*d* are schematic diagrams of fish passage systems incorporating two reversible pump turbines configured to pass fish both upstream and downstream and to pump or generate when not passing fish.
Figure 3B:
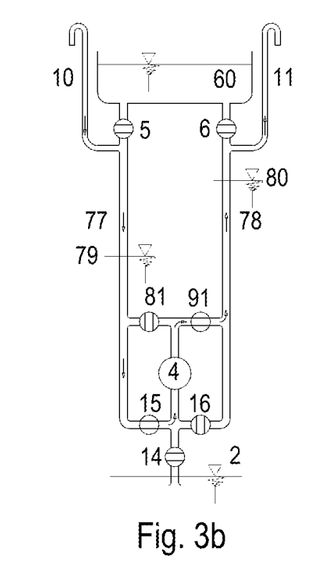

Connection to tailwater 2 is through valves 15 and 16. Once water levels 79 and 80 have been equalized, valves 81 and 16 are closed while valves 91 and 15 are opened. This allows the reversible pump turbine 4 to reverse direction of rotation and pump the remaining water from dual penstock 77 to dual penstock 78.

Figure 3C:
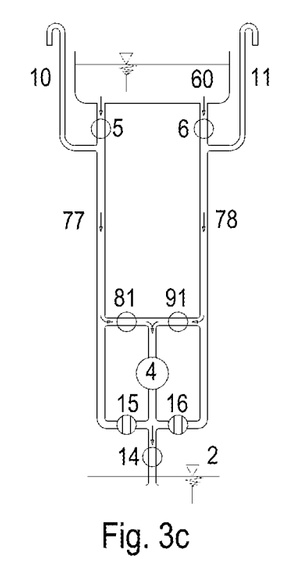

Referring to FIG. 3c, valves 5, 6, 81, 91 and 14 are opened to allow pump turbine 4 to generate power in turbine mode, discharging water from upper reservoir 60 into tailwater 2.

Figure 3D:
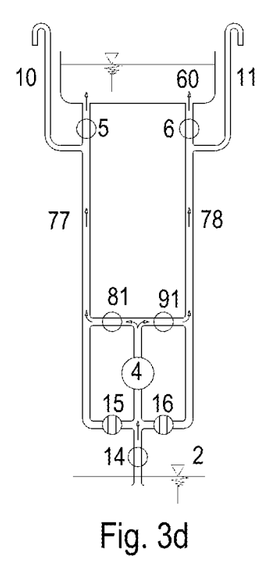

Referring to FIG. 3d, with the valves in the same position as in FIG. 3c, the pump turbine is shown pumping from tailwater 2 into upper reservoir 60 for electrical power storage, for example.

In accordance with a further aspect of the invention the lower portion of the column of water connected to the pump turbine may be separated from the top portion of the column of water by a variety of means. For example, a neutrally buoyant plug may be used. Such a plug could be provided with active buoyancy control by means of a feedback loop within the plug that might include a pressure sensor, a battery, a compressor, an air storage tank, and a ballast tank. Alternatively, the compressed air tank could be sized to eliminate the need for an on board compressor and correspondingly sized battery.

In accordance with a further aspect of the invention the fish could be isolated from the lower portion of the water column inside of a length of corrugated polyethylene culvert. Such culvert is flexible and able to conform to curvature of the penstock. It is also inexpensive, chemically inert, has good wear resistance and has a low coefficient of friction.

In accordance with a further aspect of the invention fish might be isolated from the reversible pump turbine by containing a number of fish in a plastic bag during transport. This would provide penstock conforming flexibility and a low coefficient of friction. Bag opening and closure could be done manually or in accordance with prior art related to automated bag filling. In accordance with a further aspect of the invention, a reversible pump turbine may be used to raise and lower the column of water for a downstream-only fish transport system. In the case of salmonids, the downstream migrants are small and such a system could be scale accordingly. Although such a system could be configured with a simple throttle valve at the bottom of the fish transporting pipe or penstock in conjunction with a water source at headwater pressure, presumably tapped off of a hydroelectric plant, the configuration in accordance with the present invention would generate power from the water used for fish passage.

As can be easily understood from the foregoing, the basic concepts of the present invention may be embodied in a variety of ways. It involves both water control gates as well as inflatable conduit closures or other devices to accomplish the appropriate method. In this application, the inflatable actuation methods are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which are included in this patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for the full patent application.

This patent application seeks examination of as broad a base of claims as deemed within the applicant's right and is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fish trap" or a "trap" should be understood to encompass disclosure of the act of "trapping fish"—whether explicitly discussed or not—and, conversely, were there effectively disclosure of the act of "trapping fish", such a disclosure should be understood to encompass disclosure of a "fish trap" and even a "means for trapping fish". Such changes and alternative terms are to be understood to be explicitly included in the description. Patents, publications, or other references mentioned in this application for patent are hereby incorporated by reference. In addition, as to each term used it should be understood that unless its utilization in this application is inconsistent with such interpretation, both traditional and common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the water controlling devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, xi) each potentially dependent claim or concept as a dependency on each and every one of the independent claims or concepts presented xii) individual or combined subroutines and programs as herein disclosed and described, xiii) the related methods disclosed and described, xiv) similar, equivalent, and even implicit variations of each of these systems and methods, xv) those alternative designs which accomplish each of the functions shown as are disclosed and described, xvi) those alternative designs and methods which accomplish each of the functions shown as are implicit to accomplish that which is disclosed and described, xvii) each feature, component, and step shown as separate and independent inventions, and xviii) the various combinations and permutations of each of the above.

It should also be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is and will be used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s). Please be aware that cited works of non-patent literature such as scientific or technical documents or the like may be subject to copyright protection and/or any other protection of written works as appropriate based on applicable laws. Copyrighted texts may not be copied or used in other electronic or printed publications or re-distributed without the express permission of the copyright holder.

I claim:

1. An apparatus for fish transport from tailwater to headwater of a hydroelectric project having a dam, a reversible pump turbine, and a penstock, comprising:
    tailwater attraction water configured to attract fish in said tailwater to a tailwater fish trap to generate trapped tailwater fish;
    a fish trap drain valve located between said tailwater attraction water and said penstock:
    a tailwater fish isolator that, when actuated, and when said fish trap drain valve is closed, creates said tailwater fish trap;
    a pump turbine isolation valve that when closed, isolates said reversible pump turbine from said penstock; and
    a penstock dewatering pump configured to dewater said penstock when said pump turbine isolation valve is closed and said fish trap drain valve is closed,
    wherein, when said fish trap drain valve is opened and said pump turbine isolation valve is closed, water and said trapped tailwater fish are drained from said tailwater fish trap to said penstock after it has been dewatered, and contained within said penstock, and
    wherein, when said fish trap drain valve is closed, said pump turbine isolation valve is opened, and said reversible pump turbine is operated in pump mode, said water and trapped fish drained to said penstock are moved up said penstock to said headwater.

2. The apparatus of claim 1 wherein said fish trap drain valve, when closed, and said pump turbine isolation valve, when open, enable use of the reversible pump turbine in a conventional manner instead of for transporting fish.

3. An apparatus as described in claim 1 further comprising a discharge valve established substantially at the upper end of said penstock.

4. An apparatus as described in claim 3 wherein said discharge valve comprises a duckbill valve that only allows flow to said headwater.

5. An apparatus as described in claim 1 further comprising a tailwater attraction water pump and a weir that are configured to generate said tailwater attraction water.

6. An apparatus as described in claim 1 wherein said tailwater fish isolator comprises a raisable water gate.

7. An apparatus as described in claim 6 wherein said raisable water gate comprises a pneumatically operated water gate.

8. An apparatus as described in claim 1 further comprising a vent configured to allow air to enter an upper section of the penstock.

9. An apparatus as described in claim 1 further comprising downstream fish passage componentry configured to allow downstream fish passage from said headwater through a penstock branch that also allows downstream passage of water during turbine operation of said reversible pump turbine, said penstock branch fluidically connected with said penstock.

10. An apparatus as described in claim 9 wherein said downstream fish passage componentry comprises an upper reservoir fish trap, an adjustable headwater weir configured to control flow from said headwater into said upper reservoir fish trap, a check valve established in said penstock branch, and a retractable fish screen configured to divert fish passing downstream through said penstock to a fish sluice that empties to said tailwater.

11. An apparatus as described in claim 10 wherein said adjustable headwater weir comprises a pneumatically operated headwater gate reconfigurable between an open position and a closed position.

12. A method for transporting fish past a dam comprising the steps of:
(a) providing a penstock extending between a tailwater level and a headwater level behind said dam;
(b) providing a reversible pump turbine for moving water through said penstock;
(c) closing a fish trap drain valve and actuating a tailwater fish isolator to generate a tailwater fish trap:
(d) closing a pump turbine isolation valve, and dewatering said penstock with a penstock dewatering pump;
(e) opening a fish trap drain valve to drain water and fish trapped in said tailwater fish trap to said penstock after said dewatering of said penstock; and
(f) closing said fish trap drain valve, opening said pump turbine isolation valve, and operating said pump turbine in pump mode to pump said water and fish drained to said penstock up said penstock to said headwater.

13. A method in accordance with claim 12, wherein said step of actuating a tailwater fish isolator comprises the step of pneumatically raising a water gate.

\* \* \* \* \*